United States Patent [19]

Utsumi

[11] Patent Number: 5,189,651
[45] Date of Patent: Feb. 23, 1993

[54] OPTICAL SYSTEM IN MAGNETO-OPTICAL RECORDING AND REPRODUCING DEVICE

[75] Inventor: Yoshihiro Utsumi, Saitama, Japan

[73] Assignee: Pioneer Electronic Corporation, Tokyo, Japan

[21] Appl. No.: 438,932

[22] Filed: Oct. 30, 1989

Related U.S. Application Data

[63] Continuation of Ser. No. 48,843, May 12, 1987, abandoned.

[30] Foreign Application Priority Data

May 12, 1986 [JP] Japan ............ 61-70807[U]

[51] Int. Cl.$^5$ ............................ G11B 7/00; G01J 1/36
[52] U.S. Cl. ..................................... 369/13; 360/59; 360/114; 369/110; 369/44.41; 365/122; 250/201.5
[58] Field of Search ............ 369/44.37, 110, 112, 369/13, 44.41, 46; 350/397, 402; 250/201.9, 201.5; 360/114, 59

[56] References Cited

U.S. PATENT DOCUMENTS

| | | | |
|---|---|---|---|
| 3,584,933 | 6/1971 | Habegger | 350/401 |
| 4,123,652 | 10/1978 | Bouwhuis | 369/112 |
| 4,358,200 | 11/1982 | Heemskerk | 369/45 |
| 4,410,277 | 10/1983 | Yamamoto et al. | 360/114 X |
| 4,451,863 | 5/1984 | Yanagida et al. | 369/110 X |
| 4,464,741 | 8/1984 | Compaan | 369/112 |
| 4,505,584 | 3/1985 | Kato et al. | 250/201.9 X |
| 4,546,463 | 10/1985 | Opheij | 369/46 |
| 4,558,440 | 12/1985 | Tomito | 369/110 |
| 4,592,623 | 6/1986 | Yamamoto et al. | 350/397 |
| 4,730,289 | 3/1988 | Saitoh et al. | 369/13 |
| 4,731,527 | 3/1988 | Nomura | 369/46 |
| 4,764,912 | 8/1988 | Ando | 369/45 |
| 4,797,868 | 1/1989 | Ando | 369/13 |
| 4,895,677 | 1/1990 | Okumura et al. | 350/397 |

FOREIGN PATENT DOCUMENTS 0198655 10/1986 European Pat. Off. .
3035719 4/1981 Fed. Rep. of Germany .
3429382 2/1985 Fed. Rep. of Germany .

OTHER PUBLICATIONS

Togami et al, *Amorphous GdCo disk for thermomagnetic recording*, Journal of Applied Physics, vol. 53, No. 3 pp. 2335-2337.

Primary Examiner—Stuart S. Levy
Assistant Examiner—Joseph A. Rhoa
Attorney, Agent, or Firm—Sughrue, Mion, Zinn, Macpeak & Seas

[57] ABSTRACT

A magneto-optical reproducing device in which a reflected light signal from a magneto-optical disk is divided by an astigmatic analyzer. The analyzer both divides the light signal according to linear polarization, for data signal detection, but also introduces astigmatism in one of the divided beams to allow focus detection.

10 Claims, 3 Drawing Sheets

OPTICAL SYSTEM IN MAGNETO-OPTICAL RECORDING AND REPRODUCING DEVICE

This is a continuation of application Ser. No. 07/048,843, filed May 12, 1987 now abandoned.

BACKGROUND OF THE INVENTION

This invention relates to a magneto-optical recording and reproducing device. More particularly, it relates to an optical system in a device which is so designed as to obtain a reproducing data signal and an automatic focus control signal.

A conventional optical system in a photo-electromagnetic recording and reproducing device is disadvantageous in that it has a large number of components and an intricate arrangement. Accordingly, it is difficult to miniaturize the optical system, and the manufacturing cost is relatively high.

SUMMARY OF THE INVENTION

An object of this invention is to eliminate the above-described difficulties accompanying a conventional optical system in a magneto-optical recording and reproducing device. More specifically an object of the invention is to provide an optical system for a magneto-optical recording and reproducing device which is made simpler in construction by reducing the number of components.

The foregoing objects of the invention have been achieved by the provision of an optical system for a magneto-optical recording and reproducing device for reading signals magneto-optically. This system, according to the invention, comprises an astigmatism causing analyzer having both an astigmatism causing function for detecting automatic focus control signals and an analyzer function for detecting magneto-optical signals.

In the optical system, the direction of polarization of a laser beam source for reading the magneto-optical signals and the direction of recording tracks may be parallel with or perpendicular to each other. The meridian surface and the incident surface of the astigmatism causing analyzer may form substantially 45° with the direction of polarization of the laser beam and the direction of recording tracks.

DETAILED DESCRIPTION OF THE PREFERRED EMBODIMENTS

Preferred embodiments of the invention will be described with reference to the accompanying drawings.

Figure 1:
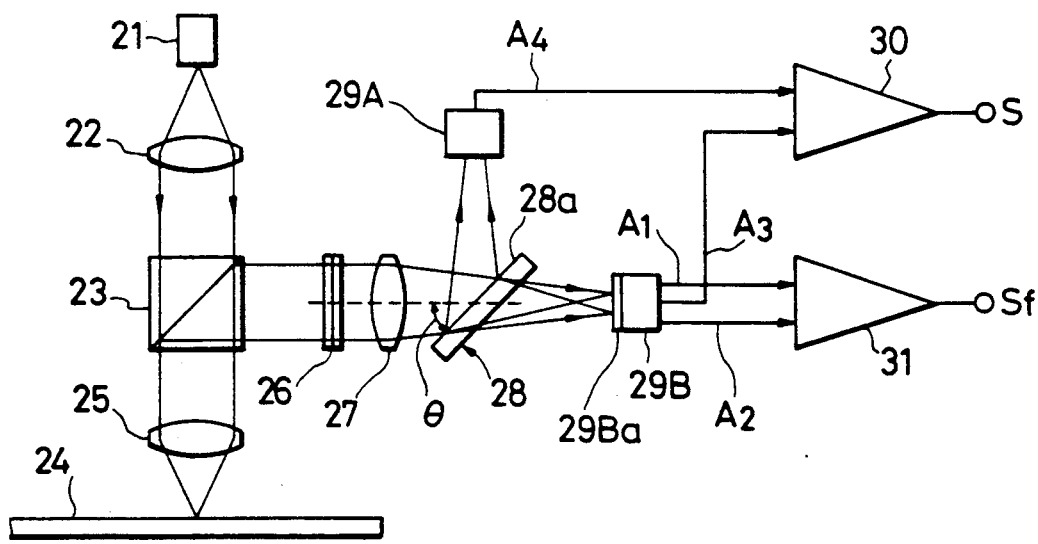
FIG. 1 is an explanatory diagram outlining the arrangement of a first embodiment of an optical system in a magneto-optical recording and reproducing device according to this invention.

FIG. 1 is an explanatory diagram outlining the arrangement of a first embodiment of an optical system in a magneto-optical recording and reproducing device according to the invention.

In FIG. 1, a laser beam source 21 such as a laser diode outputs a laser beam. A collimator 22 converts the laser beam produced by the laser beam source 21 into a parallel beam. A half mirror 23 separates the "advancing" and "regressing" beams from each other. Data is recorded on a magneto-optical disk 24 by vertical magnetization. An objective lens 25 focuses the laser beam on the recording surface of the disk 24. A ½ wavelength plate 26 changes the direction of the plane of polarization of the beam. A lens 27 focuses the light.

An astigmatism causing analyzer 28 has both an astigmatism causing function for obtaining an automatic focus control (error) signal and an analyzer function for detecting a magneto-optical signal. The astigmatism causing analyzer 28 is formed by forming a polarization film 28a on one side of a flat plate whose both sides are in parallel with each other. The polarization film 28a, often called a polarizer, passes the linearly polarized component of light aligned with its main transmission axis.

Similarly as in the case of a polarization beam splitter, the astigmatism causing analyzer or plate 28 transmits substantially 100% of a p-polarized light component out through a conveyance surface, and reflects substantially 100% of an s-polarized light component. Therefore, the plate 28 functions as an analyzer for detecting the magneto-optical signal. Furthermore, the plate 28 is disposed obliquely with respect to the optical axis of the incident light. In other words, an angle $\theta$ formed between the incident surface of the plate 28 and the optical axis of the light beam is not 90 degrees. Although $\theta$ is illustrated as about 45 degrees in FIG. 1, it does not need to be this value. Furthermore, the beam transmitted to the plate 28 has already been converted into a converging beam by the lens 27. Since the plate disposed obliquely in the light beam constitutes an astigmatic element for the converging beam, the plate 28 functions also as an astigmatism causing element.

As shown in FIG. 1, there are provided detectors 29A and 29B for detecting recorded data by converting the light beam entered in the detectors into electric signals. The detector 29B detects also a focusing state of the beam and outputs a focus error signal. Differential amplifiers 30 and 31 process the outputs of the detectors 29A and 29B.

Figure 1A:
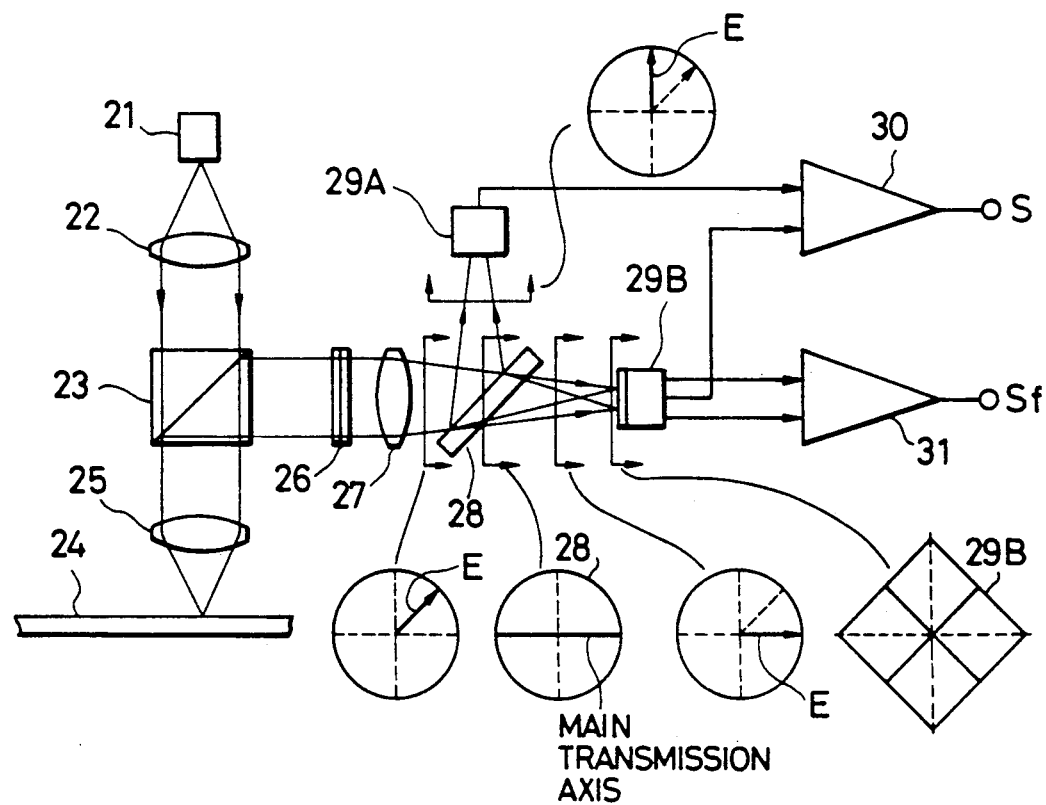
FIG. 1A is an explanatory diagram showing one example of the directions of the plane of polarization of the light beam at various positions in the optical system of FIG. 1.
Figure 1B:
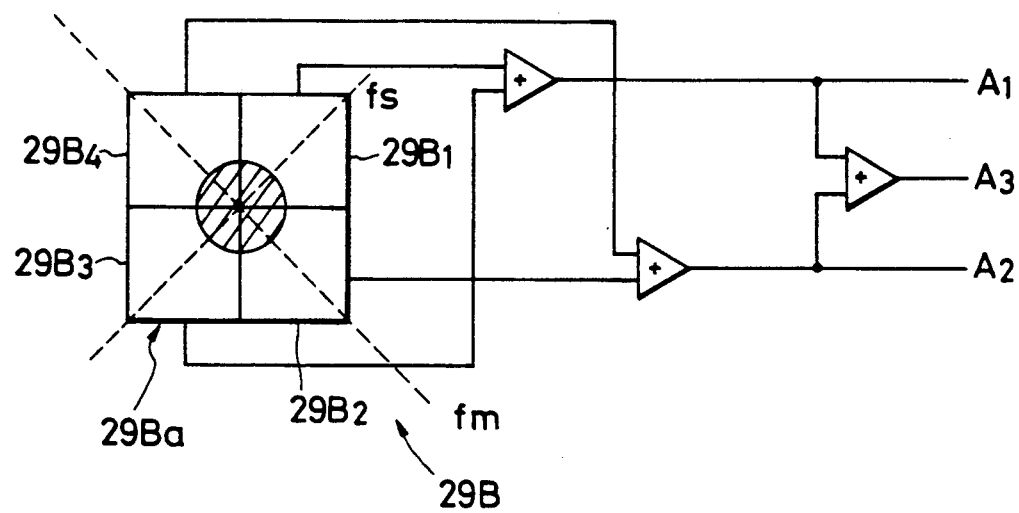
FIG. 1B is an explanatory diagram illustrating the detector 29B in the arrangement of FIG. 1.

The detector 29B is, for example, a four segment detector comprising four elements $29B_1$, $29B_2$, $29B_3$ and $29B_4$, as shown in FIG. 1B. The detector 29B is disposed such that the lines dividing the light-receiving surface $29B_a$ to form the four elements would form angles of 45 degrees with respect to the focus line $f_s$ in a sagittal direction of the incident beam to the detector 29B and the focus line $f_m$ in a meridional direction, respectively. Light flux enters the detector 29B such that the light flux is distributed across the light-receiving surface $29B_a$, as shown by oblique lines in FIG. 1B. Output signals of the elements $29B_1$ and $29B_3$ are added by an adder to form one focusing signal $A_1$. Output signals of the element $29B_2$ and $29B_4$ are added by the other adder to form the other focusing signal $A_2$. On the other hand, a data signal $A_3$ is the sum of the four output signals $29B_1$, $29B_2$, $29B_3$ and $29B_4$. The data signal $A_3$ is, for example, formed by adding the focusing signals $A_1$ and $A_2$ by an adder.

The two focusing signals $A_1$ and $A_2$ of the detector 29B are applied to a differential amplifier 31, which outputs the differential between the two signals $A_1$ and $A_2$ as a focus error signal $S_f$. The data signal $A_3$ is applied to the differential amplifier 30, together with the data signal $A_4$ outputted from the detector 29A, to form the reproducing data signal S.

Furthermore, by changing the angle $\theta$ formed between the optical axis of the incident light and the incident surface of the plate 28, sensitivity of the detection of the focus error can be adjusted.

The operation of the optical system thus organized will be described, in detail.

A laser beam produced by the laser beam source 21 is converted into a parallel beam by the collimator 22. The parallel beam is focused on the recording surface of the magneto-optical disk 24 through the half-mirror 23 and the objective lens 25. The beam reflected from the recording surface of the disk 24 is separated by the half mirror 23, and the plane of polarization is turned by the ½ wave-length plate 26 so that it forms an azimuth angle of 45° with respect to the incident surface of the plate 28. As a result, the light beam reaches the incident surface of the plate 28 such that the plane of polarization of the beam forms 45 degrees with respect to the main transmission axis of the polarization film 28a on the plate 28. Therefore, the amplitude of the light (p-polarized light component) transmitted through the polarization film 28a is equal to the amplitude of the light (s-polarized light component) reflected from the polarization film 28a.

FIG. 1A illustrates the direction of the polarization plane E of the light at various positions in the optical system of FIG. 1, in the case where the main transmission axis of the polarization film 28a lies in the surface of the drawing. FIG. 1A shows the direction of the polarization plane E of the light beam at the respective portions, taken along the plane perpendicular to the optical axis of the light beam transmitted. FIG. 1A also shows the direction of the lines dividing the light-receiving surface $29B_a$ of the detector 29 into the four elements.

Data have been recorded on the disk 24 with alternating directions of magnetization. Because of the Kerr effect, the plane of polarization of the light beam reflected on the disk 24 is slightly turned, in accordance with the magnetization state of the portion on the disk 24 where the beam is reflected. Therefore, the direction of the plane of polarization of the light beam reflected on the data-recorded portion on the disk 24 is slightly turned and different from the direction of the plane of polarization of the beam reflected at the non-recorded portion. As a result, the light beam reflected at the data-recorded portion reaches the plate 28 such that the amount of the azimuth angle of the plane of polarization thereof with respect to the incident surface of the plate 28 is slightly shifted from the 45 degrees which is the azimuth angle of the plane of polarization of the beam reflected from the non-recorded portion. That is, the direction of the plane of polarization of the beam is slightly different from the direction which forms an angle of 45 degrees with respect to the main transmission axis of the polarization film 28a on the plate 28. Therefore, the amplitudes, i.e. the intensity of the light passed through the plate 28 (p-polarized light component) and the light reflected on the plate 28 (s-polarized light component) are changed from those obtained by light beam reflected at the non-recorded portion.

As explained above, the beam passed through the plate 28 and the beam reflected from the plate 28 are changed in intensity, in accordance with the data recorded on the disk 24 or the directions of the magnitization on the disk 24. Therefore, recorded data signals $A_4$ and $A_3$ are outputted by the detectors 29A and 29B respectively, in accordance with the directions of magnetization on the disk 24. The variations in intensity of the beams passed through and reflected from the analyzer 28 are opposite in phase from each other. That is, when the plane of polarization of the beam is turned and the amplitude of the beam transmitted through the analyzer 28 is increased, the amplitude of the beam reflected on the analyzer 28 is reduced. And if the plane of polarization of the beam is turned to reduce the amplitude of the beam transmitted through the analyzer 28, the amplitude of the beam reflected on the analyzer 28 is increased. Therefore, the difference between the recorded data signals $A_4$ and $A_3$ outputted by the detectors 29A and 29B is formed and outputted as a reproducing data signal S by the differential amplifier 30.

As described above, since the recorded data signal S is obtained from the difference between the two data signals, optical intensity variation noise in the laser beam produced by the laser beam source can be cancelled and neglected. This effect is based on the facts that, since the plane of polarization lies at about 45 degrees with respect to the main transmission axis of the polarization film on the plate, the optical intensity variation noise components are equal in phase and in amplitude, thus being cancelled out by the differential amplifier 30.

The beam which passes through the plate 28 achieves a degree of astigmatism suitable for the detection of a focus error. The detector 29B receives the astigmatic light beam and outputs the focusing signals $A_1$ and $A_2$, together with the recorded data signal $A_3$. The focusing signals $A_1$ and $A_2$ of the detector 29B are applied to the differential amplifier 31, which provides the difference between the focusing signals $A_1$ and $A_2$ as a focus error signal $S_f$.

As described above, the detector 29B outputs both the data signal and the focus error signal. Therefore, in the case where it is unnecessary to obtain the recorded data signal from the difference between the two data signals, the detector 29A is not a necessary element for the device.

In the first embodiment of the optical system in the magneto-optical recording and reproducing device, as described above, the ½-wavelength plate 26 is disposed in front of the lens 27. However, the ½-wavelength plate 26 can be eliminated, if the plate 28 is disposed such that the light beam reaches the incident surface of the plate 28, with the plane of polarization of the beam forming an azimuth angle of 45 degrees with respect to the incident surface of the plate 28, similarly to FIG. 1A, that is, the plane of polarization of the beam forming an angle of 45 degrees with respect to the main transmission axis of the polarization film 28a on the plate 28. In order to dispose the plate 28 as described above, for example, as shown in FIG. 2, both the direction of polarization, indicated by the arrow E, of the laser beam produced by the laser beam source 21 and the direction of the recording track on the recording medium, indicated by the arrow T, are parallel to each other, and lie in the plane of the drawing FIG. 2. Furthermore, the plate 28 is disposed such that the polarization direction E and the track direction T form an angle of 45° with the incident surface and the meridian plane of the plate 28. The meridian plane is perpendicular to the incident surface and contains the main transmission axis. The above-mentioned arrangement of the plate 28 is achieved, for example, by turning the plate 28 shown in FIG. 1A where the main transmission axis of the polarization film lies in the surface of the drawing FIG. 1A, through an angle of 45 degrees about the optical axis of the light beam which reaches the plate 28. The arrangement of the plate 28 is shown in FIG. 2A, which, as an example, shows the track direction T, the direction E of the plane of polarization of the beam, the direction of the main transmission axis of the polarization film and the directions of the lines dividing the light-receiving surface of the detector 29B into the four elements.

By the optical system of the above-described second embodiment of the present invention, without using the ½-wavelength plate 26 a satisfactory reproducing data signal S can be obtained. This effect is based on the facts that, since the plane of polarization forms an angle at about 45° with the main transmission axis of the polarization film on the plate, the optical intensity variation noise components are almost equal in phase and in amplitude, thus being cancelled out by the differential amplifier 30.

Figure 2:
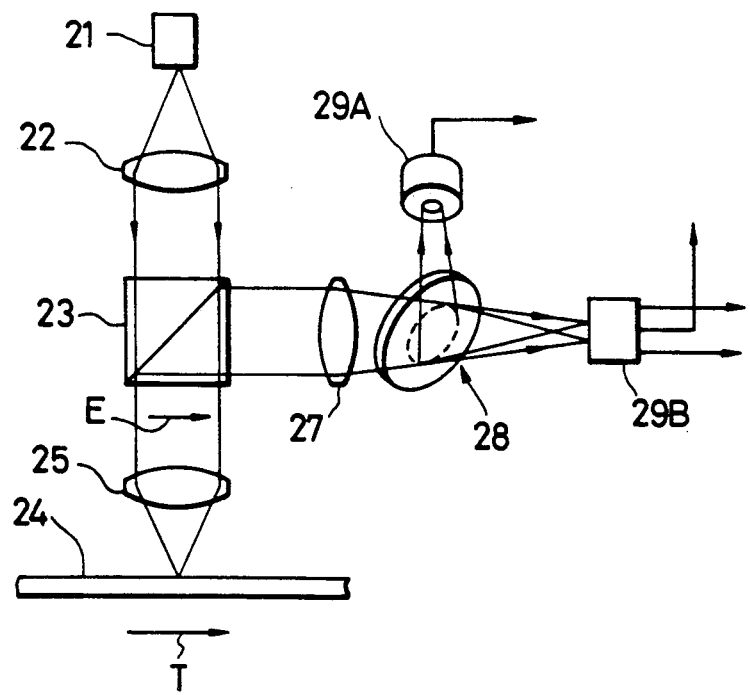
FIG. 2 is an explanatory diagram outlining the arrangement of a second embodiment of the optical system according to the invention.
Figure 2A:
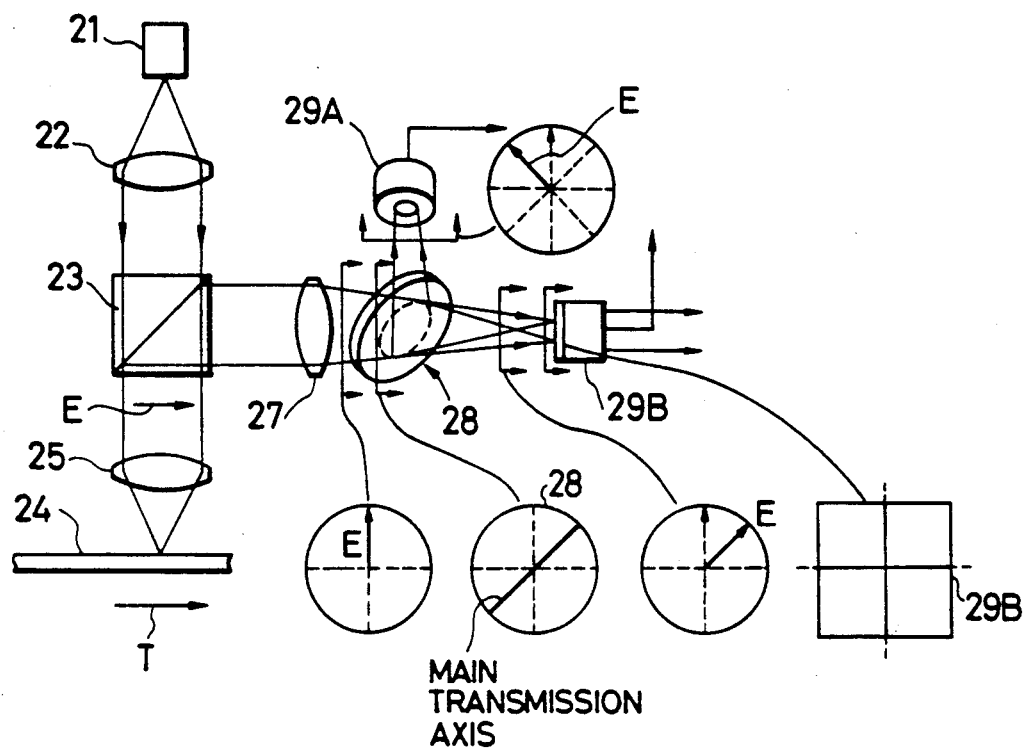
FIG. 2A is an explanatory diagram showing one example of the direction of the plane of polarization of the light beam at various positions in the optical system of FIG. 2.

As shown in FIG. 2A, one of the lines separating the four segments from one another is parallel to the track direction. Therefore, a focus error signal $S_f$ less affected by track traverse noise can be obtained. This effect is based on the facts that, since the symmetrical axis of a diffraction light pattern formed by the track coincides with one of the lines which divide the light receiving surface of the detector 29B, the track traverse noise is lessened.

A similar result can be achieved when the direction of polarization E is perpendicular to the tracking direction T.

In FIG. 2, the differential amplifiers 30 and 31 are not shown.

In the above-described examples, the astigmatism causing analyzer 28 is in the form of a flat plate having two parallel sides, as was described above. However, the invention is not limited thereto or thereby. Other examples of the analyzer 28 are as shown in FIGS. 3 and 4.

Figure 3:
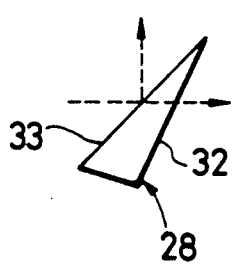
FIG. 3 is a side view showing another example of an astigmatism causing analyzer in FIGS. 1 or 2.
Figure 4:
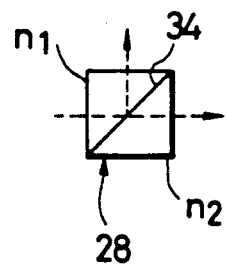
FIG. 4 is a side view showing still another example of an astigmatism causing analyzer.

The analyzer 28 shown in FIG. 3 is in the form of a wedge having a polarization film 33 on its one surface. The analyzer 28 shown in FIG. 4 is a polarization beam splitter in the form of a cube which is formed by joining prism members of different refractive index ($n_1 \neq n_2$) and providing a polarization film 34 therebetween. Both of the analyzers can provide the same effects as the analyzer 28 shown in FIGS. 1 and 2.

As was described above, in the photo-electro-magnetic recording and reproducing device for reading signals magneto-optically, one astigmatism causing analyzer 28 performs the astigmatism causing function for detecting the automatic focus control signal and the analyzer function for detecting the magneto-optical signal according to the invention.

In other words, the magneto-optical recording and reproducing device is so designed that one optical element 28 has the astigmatism causing function and the analyzer function. Therefore, the device can be made small both in size and in weight, and the number of components and the manufacturing cost can be reduced.

In general, in a magneto-optical reproduction with small optical variations as signal data, the loss in optical intensity attributing to the optical components greatly affects the S/N ratio. However, the reduction of the number of components according to the invention contributes to decrease of the loss of optical intensity, and to an improvement on the S/N ratio.

What is claimed is:

1. A reproducing device for reading signals, comprising:
    means for obtaining a reflected light signal from a magneto-optical recording medium;
    a single astigmatic plate forming an integral astigmatism causing analyzer element, said astigmatic plate having an incident surface provided with a polarizing film thereon and a conveyance surface opposed to said incident surface, said reflected light being incident on said incident surface of said astigmatic plate, such that a plane of said incident surface forms a predetermined angle to a polarization plane of said reflected light, said polarizing film receiving and dividing said reflected light signal into a first light signal, which reflects from said polarizing film and a second light signal, which passes through said polarizing film, said first and second light signals being of different polarization, and said astigmatic plate causing said second light signal to be more astigmatic than said first light signal;
    a first light detector for receiving said first light signal directly from said polarizing film as a first data signal; and
    a second light detector for receiving said second light signal directly from said conveyance surface of the astigmatic plate as a focusing signal.

2. A reproducing device as recited in claim 1, wherein said second light detector additionally provides a second data signal and further comprising means for combining said first and second data signals.

3. A reproducing device as recited in claim 1, wherein said obtaining means includes a source of laser light linearly polarized along a first direction substantially parallel with or perpendicular to a second direction corresponding to a track direction of said recording medium, and
    said single astigmatic plate having an incident surface, said predetermined angle being substantially equal to 45°.

4. A reproducing device as recited in claim 1, wherein said incident surface on said astigmatic plate is parallel to said conveyance surface, said incident surface receiving said reflected light signal inclined to a direction of propagation of said reflected light signal.

5. A reproducing device as recited in claim 1, wherein said analyzer comprises two prisms of differing refractive indices joined at a surface inclined to a direction of propagation of said reflected light signal.

6. The reproducing device as claimed in claim 1, wherein the plane of polarization of said reflected light, which is received by said polarization film, remains unchanged between a half mirror of said obtaining means and said polarization film.

7. A reproducing device as recited in claim 1, wherein said first beam is not astigmatic.

8. A reproducing device for reading signals, comprising:

a read beam having a polarization direction;

separating means for receiving said read beam and for separating said read beam into first and second beams in a proportion dependent upon said polarization directions, said separating means including a single astigmatic plate having an incident surface on which said first beams are reflected and a conveyance surface through which said second beams pass, said incident surface being parallel to the conveyance surface, said astigmatic plate including a polarization film thereon, whereby said polarization film separates said first and second beams and said astigmatic plate causes said second beam to be more astigmatic than said first beam;

first and second detectors for directly receiving said first and second beams directly from the incident and conveyance surfaces, respectively, such that said first and second beams are unaltered between said astigmatic plate and said detectors;

focusing signal generating means, connected to the second detector, responsive only to said second beam, for generating a focusing signal; and data signal generating means, connected to the first and second detectors, responsive to both of said first and second beams, for generating a data signal.

9. The reproducing device as claimed in claim 8, wherein said separating means comprises an astigmatic causing element for causing an astigmatism in said first beam.

10. A reproducing device as recited in claim 8, wherein said first beam is not astigmatic.

* * * * *